United States Patent
Beuth et al.

(10) Patent No.: US 6,766,091 B2
(45) Date of Patent: Jul. 20, 2004

(54) POLYMERIC OPTICAL CONDUCTORS

(75) Inventors: Reinhard Beuth, Marl (DE); Michael Schlobohm, Haltern am See (DE); Uwe Kannengiesser, Duisburg (DE); Franz-Erich Baumann, Duelmen (DE); Herald Haeger, Recklinghausen (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/603,710

(22) Filed: Jun. 26, 2003

(65) Prior Publication Data

US 2004/0001682 A1 Jan. 1, 2004

(30) Foreign Application Priority Data

Jun. 26, 2002 (DE) .......................... 102 28 439

(51) Int. Cl.⁷ ............................. G02B 6/22; G02B 6/16; G02B 6/02
(52) U.S. Cl. ....................... 385/128; 385/123; 385/124; 385/125; 385/126; 385/127
(58) Field of Search ................................ 385/123, 126, 385/127, 128

(56) References Cited

U.S. PATENT DOCUMENTS 3,980,390 A * 9/1976 Yamamoto et al. ......... 385/128
4,356,300 A   10/1982 Isler et al.
4,381,269 A * 4/1983 Kaino et al. ............... 264/1.24

(List continued on next page.)

FOREIGN PATENT DOCUMENTS

DE   30 06 961   8/1980
DE   199 14 743  1/2001

(List continued on next page.)

OTHER PUBLICATIONS

K. Ivin, et al., "Ring–Opening Polymerization", Elsevier Applied Science Publishers Ltd., vol. 1, pp. 121–190, 1984.
Andreas Weinert, "Kunststoff–Lichtwellenleiter–Technischer Stand und Entwicklungstrends", pp. 187–190, 1995. (w/Partial English Translation).

(List continued on next page.)

Primary Examiner—John R. Lee
Assistant Examiner—Bernard Souw
(74) Attorney, Agent, or Firm—Oblon, Spivak, McClelland, Maier & Neustadt, P.C.

(57) ABSTRACT

An optical cable, which is flame-retardant, and has excellent adhesion of the protective covering to the fiber cladding and uniform thickness of the fiber cladding, contains a polymer optical conductor containing a fiber core; a single-layer or multi-layer fiber cladding; an inner external layer which adheres to the fiber cladding with a peel force of at least 50 N; and an outer external layer which adheres to the inner external layer with a peel force of not more than 30 N. The inner external layer contains a molding composition having a first polyamide selected from a) PA 11, b) PA 12, c) PA 1012, d) PA 1212, e) a copolyamide of at least two of PA 11, PA 12, PA 1012 and PA 1212, said copolyamide containing not more than 30 mol % of a comonomer, and f) mixtures thereof. The first polyamide contains at least 50 $\mu$eq/g of amino end groups. The first molding composition has a zero-shear viscosity of from 400 to 6000 Pas. The outer external layer contains a second molding composition which has the following i)–iii): i) from 20 to 95% by weight of a second polyamide selected from a) PA 11, b) PA 12, c) PA 1012, d) PA 1212, e) a copolyamide of at least two of PA 11, PA 12, PA 1012 and PA 1212, said copolyamide containing not more than 30 mol % of a comonomer, f) a polyetheramide of at least one of a)–e), and g) mixtures thereof, ii) from 5 to 45% by weight of a flame retardant, and iii) from 0 to 60% by weight of an impact modifier.

19 Claims, 1 Drawing Sheet

U.S. PATENT DOCUMENTS

| | | | | |
|---|---|---|---|---|
| 4,770,493 A | * | 9/1988 | Ara et al. | 385/102 |
| 4,836,642 A | * | 6/1989 | Matsumoto et al. | 385/145 |
| 4,854,668 A | * | 8/1989 | Mayr et al. | 385/128 |
| 5,136,683 A | * | 8/1992 | Aoki et al. | 385/141 |
| 5,510,160 A | | 4/1996 | Jadamus et al. | |
| 5,554,426 A | | 9/1996 | Roeber et al. | |
| 5,637,400 A | * | 6/1997 | Brekner et al. | 428/373 |
| 5,898,810 A | * | 4/1999 | Devens et al. | 385/123 |
| 6,026,208 A | * | 2/2000 | Will et al. | 385/128 |
| 6,438,306 B1 | * | 8/2002 | Bishop et al. | 385/128 |
| 6,453,104 B1 | * | 9/2002 | Shimada et al. | 385/128 |
| 6,584,256 B2 | * | 6/2003 | Shimada et al. | 385/102 |
| 2003/0044136 A1 | * | 3/2003 | Nakamura et al. | 385/102 |
| 2003/0072546 A1 | * | 4/2003 | Shimada et al. | 385/102 |
| 2004/0001682 A1 | * | 1/2004 | Beuth et al. | 385/128 |

FOREIGN PATENT DOCUMENTS

| | | |
|---|---|---|
| EP | 0 296 852 | 12/1988 |
| EP | 0 434 244 | 6/1991 |
| EP | 0 637 511 | 2/1995 |
| EP | 0 673 762 | 9/1995 |
| WO | WO 99/12063 | 3/1999 |
| WO | WO 00/60382 | 10/2000 |

OTHER PUBLICATIONS

A. Dräxler, Kautschuk + Gummi, Kunststoff 1981, pp. 185–190.

* cited by examiner

POLYMERIC OPTICAL CONDUCTORS

FIELD OF THE INVENTION

The present invention relates to an optical cable which comprises a fiber core, a fiber cladding, a protective polyamide layer firmly adhering thereto, and an external layer.

DISCUSSION OF THE BACKGROUND

Polymeric optical fibers (referred to below by the abbreviated term POFs) are used in the telecommunications sector as optical transmission components which provide resistance to failure and simplicity of operation wherever the distance between the transmitter and receiver is only a few meters to a maximum of about 150 m. POFs are also of increasing importance in the sectors of traffic engineering/vehicle construction (data transmission and signal transmission in motor vehicles, aircraft, ships, etc.), lighting (variable traffic signs), automation technology (machine control), and sensor technology (see, for example, Draht 46 (1995) 4, pp. 187–190).

A POF serving for data transmission or signal transmission is composed of a fiber core often manufactured from polymethyl methacrylate (PMMA; refractive index $\eta_{PMMA}$=1.49), and of a single- or multilayer fiber cladding concentrically sheathing the fiber core. The cladding material mainly used is fluorinated polymers, the refractive index of which is in the range from 1.35 to 1.42. The optical attenuation of such a POF is typically from 130 to 150 db/km ($\lambda$=650 nm), and the minimum bending radius is from about 5 to 10 mm.

In order to protect the sensitive POF from mechanical, thermal, and chemical effects it is provided with a polymer sheath functioning as protective covering, and the sheath may also, where appropriate, have a multilayer structure (WO 99/12063). The polymer sheath applied by means of an extruder can, depending on the application or application sector, be composed of polyethylene (PE), polyvinyl chloride (PVC), ethylene-vinyl acetate (EVA), or polyamide (PA), for example.

In the automobile construction sector, polyamides are used as protective covering material, since they comply with the requirements prevailing in that field in terms of mechanical strength (primarily tensile strength and crush resistance), maximum service temperature, and chemicals resistance. However, the poor adhesion of the protective polyamide covering on a POF whose fiber material is composed of a fluorinated polymer poses problems. The weak adhesion of the protective covering is particularly disadvantageous when the optical cable (POF plus protective covering) has been laid in an environment exposed to large temperature variations, e.g. the passenger compartment of a motor vehicle, and the POF moves relative to the protective covering because its thermal expansion properties are different and the adhesion of the polyamide to the fluorinated polymer is poor. An example of a consequence of this is that the distance of the end of the POF from the transmitter and receiver (light-emitting diode/PIN diode) sometimes becomes so great that the intensity losses arising are unacceptably high and in certain cases lead to failure of the data-transmission path. In addition, there is the danger of damage to the transmitter or receiver if there is excessive movement of the POF out of the protective covering.

To suppress this effect, termed "pistoning" of the POF, the plugs, couplers, or holders used exert large clamping or crimping forces on the protective covering and thus increase the friction between protective covering and POF. However, the resultant deformation of the interface between fiber core and fiber cladding causes increased signal attenuation.

Although removal of the protective sheathing layer in the plug prevents "pistoning", there is the associated danger of damage to the fiber cladding during assembly due to incorrect operation of the stripping tool with its two blades.

The clamping or crimping forces exerted by the plug on the optical cable can also be reduced by using an interlocking anchoring method for the POF in a cone-shaped hole in the plug housing. For example, one proposal uses a hotplate for partial melting of the end of the POF, presses the resultant molten lip into the hole, which narrows toward the inside of the plug, and so anchors the POF firmly within the plug housing. However, the shape of the POF in the region which has melted and therefore deformed sometimes diverges considerably from the cylindrical shape permitting total reflection, and increased intensity losses therefore arise in the plug housing.

DE 199 14 743 A1 and the equivalent WO 00/60382 give a solution for this problem. The latter discloses an optical cable with a POF which has a fiber core and has a single- or multilayer fiber cladding, and also at least one protective covering surrounding the POF, where the fiber cladding or at least its outer layer is composed of a fluorinated polymer, and the protective covering is composed of polyamides or copolyamides with a melting point below 220° C. The protective covering requires no assistance to adhere to the fiber cladding, because the carboxy end group concentration of the polyamide is not more than 15 $\mu$eq/g and the amino end group concentration is in the range from 50 to 300 $\mu$eq/g. These polyamides used in WO 00/60382 are of low viscosity in order that they can be extruded onto the fiber cladding at minimum melt temperature. The maximum extrusion temperature is therefore only from about 185 to 200° C.

WO 00/60382 mentions the possibility of admixing fillers, such as carbon black, with the protective covering material, or forming the protective covering from two or more layers, but no information of a more specific nature is given.

However, the optical cables disclosed in WO 00/60382 have a number of disadvantages:

adequate adhesion is not always achieved at the extrusion temperatures given;

extrusion of a low-viscosity polyamide melt does not give sufficient melt pressure to achieve the required adhesion under tension;

the flame retardancy demanded by the market cannot readily be achieved in the single-layer sheath as proposed, since the flame retardants usually used impair adhesion to the fiber cladding and, furthermore, the optical attenuation is affected by the migration of the flame retardant or by the mechanical action of particles of the flame retardant on the fiber sheath.

SUMMARY OF THE INVENTION

It is therefore an object of the present invention to provide a flame-retardant POF which has excellent adhesion of the protective covering to the fiber cladding, and which moreover has a uniform thickness of protective covering.

This and other objects have been achieved by the present invention the first embodiment of which includes an optical cable, comprising:

a polymer optical conductor comprising a fiber core;

a single-layer or multi-layer fiber cladding;

an inner external layer which adheres to said fiber cladding with a peel force of at least 50 N and comprises a first molding composition which comprises a first polyamide; and an outer external layer which adheres to said inner external layer with a peel force of not more than 30 N;

wherein said first polyamide is selected from the group consisting of a) PA 11, b) PA 12, c) PA 1012, d) PA 1212, e) a copolyamide of at least two of PA 11, PA 12, PA 1012 and PA 1212, said copolyamide containing not more than 30 mol % of a comonomer, and f) mixtures thereof;

wherein said first polyamide contains at least 50 µeq/g of amino end groups;

wherein said first molding composition has a zero-shear viscosity of from 400 to 6000 Pas, measured according to ASTM D4440 at 220° C.; and wherein said outer external layer comprises a second molding composition which comprises the following i)–iii):
  i) from 20 to 95% by weight of a second polyamide selected from the group consisting of a) PA 11, b) PA 12, c) PA 1012, d) PA 1212, e) a copolyamide of at least two of PA 11, PA 12, PA 1012 and PA 1212, said copolyamide containing not more than 30 mol % of a comonomer, f) a polyetheramide of at least one of a)–e), and g) mixtures thereof,
  ii) from 5 to 45% by weight of a flame retardant, and
  iii) from 0 to 60% by weight of an impact modifier, wherein an amount of i), ii) and iii) is based on a total amount of i)+ii)+iii).

DETAILED DESCRIPTION OF THE INVENTION

Figure 1:
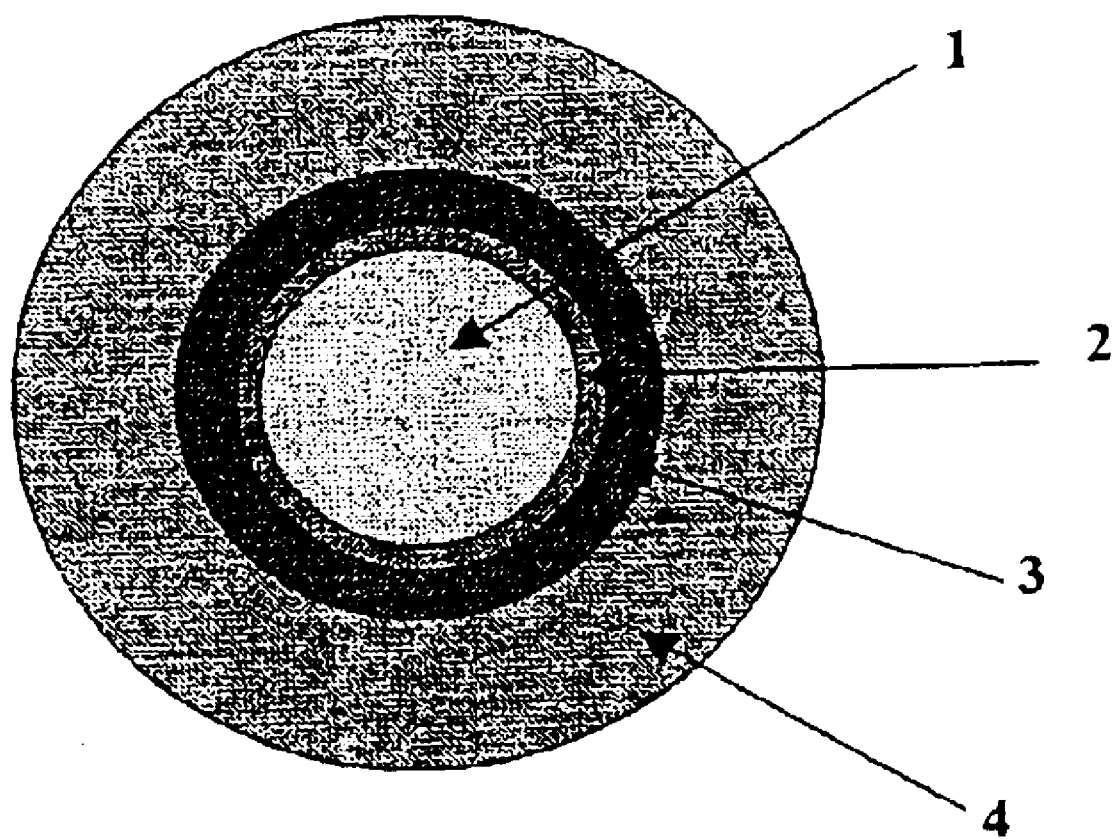
FIG. 1 shows an example of an optical cable according to the present invention.

An optical cable according to the present invention is exemplified in FIG. 1. The optical cable has a fiber core (1) and a single- or multilayer fiber cladding (2), and comprises at least the following additional layers:

an inner external layer (3), which adheres firmly to the fiber cladding and comprises a molding composition which comprises a polyamide and comprises preferably substantially a polyamide, where
  a) the polyamide has been selected from the group of PA 11, PA 12, PA 1012, PA 1212, a copolyamide based on one of these polyamides and containing not more than 30 mol %, preferably not more than 20 mol %, and most preferably not more than 10 mol % of comonomers, and mixtures of these;
  b) the polyamide contains at least 50 µeq/g of amino end groups, preferably at least 100 µeq/g, and most preferably at least 150 µeq/g of amino end groups; and
  c) the polyamide molding composition has a zero-shear viscosity in the range from 400 to 6000 Pas, preferably from 500 to 3000 Pas, particularly preferably from 600 to 2000 Pas, and with particular preference from 700 to 1200 Pas, measured to ASTM D4440 at 220° C.;

an outer external layer (4), which adheres to the inner external layer with a peel force of not more than 30 N, preferably not more than 20 N, and most preferably not more than 10 N, and comprises a polyamide molding composition which comprises the following components:
  a) from 20 to 95% by weight of a polyamide selected from the group of PA 11, PA 12, PA 1012, PA 1212, a copolyamide based on one of these polyamides and containing not more than 30 mol %, preferably not more than 20 mol %, most preferably not more than 10 mol % of comonomers, a polyetheramide based on one of these polyamides or copolyamides, and mixtures of these,
  b) from 5 to 45% by weight of a flame retardant,
  c) from 0 to 60% by weight of an impact modifier, where the percentages are based on the entirety of a), b), and c).

The amount of a) of the polyamide molding composition of the outer external layer (4) includes all values and subvalues therebetween, especially including 25, 30, 35, 40, 45, 50, 55, 60, 65, 70, 75, 80, 85 and 90% by weight. The amount of the flame retardant b) includes all values and subvalues therebetween, especially including 10, 15, 20, 25, 30, 35 and 40% by weight. The amount of impact modifier c) includes all values and subvalues therebetween, especially including 5, 10, 15, 20, 25, 30, 35, 40, 45, 50 and 55% by weight.

The optical cable shown in cross section in FIG. 1, only diagrammatically and not to scale, is used in particular as a transmission unit for the dependable transmission of data and signals within the passenger compartment of a motor vehicle. The optically conducting structure present in the cable is what is known as a step-index-profile optical conductor, which in the example shown is composed of a PMMA fiber core 1 with a diameter in the region of 1000 µm and of a single- or multilayer fiber cladding 2 manufactured from a fluorinated polymer. The optical attenuation of the fiber core 1 is typically from 70 to 100 db/km ($\lambda$=570 nm) or from 125 to 150 db/km ($\lambda$=650 nm). The optical attenuation of the fiber core at $\lambda$=570 nm includes all values and subvalues therebetween, especially including 75, 80, 85, 90 and 95 db/km. The optical attenuation of the fiber core at $\lambda$=650 nm includes all values and subvalues therebetween, especially including 130, 135, 140 and 145 db/km.

The fluorinated polymers used as cladding material or material for the outer cladding layer may be homopolymers or copolymers of fluorinated monomers, or else copolymers of fluorinated monomers with acrylic acid or with acrylates, or else a mixture of these polymers or copolymers. Preferred fluorinated monomers are vinylidene fluoride, tetrafluoroethene, hexafluoropropene, tetrafluoropropyl methacrylate, pentafluoropropyl methacrylate, trifluoroethyl methacrylate, heptadecafluorodecyl methacrylate, or mixtures of these.

In one possible embodiment, the cladding material comprises polyvinylidene fluoride, where appropriate mixed with PMMA, or with a polyglutarimide (EP-A-0 637 511), or with an acrylate copolymer (EP-A-0 673 762).

The external diameters of the fiber core 1 and of the fiber cladding 2 preferably correspond to the standard specified in IEC 60793-2 (outer diameter of cladding 1000±60 µm; core diameter typically smaller by from 10 to 20 µm; numerical aperture 0.5±0.15).

However, it is also possible to select the external diameters of the fiber core 1 and of the fiber cladding 2 in accordance with other standard values (Øcladding=750±45 µm or 500 ±30 µm), or to harmonize them with the dimensions of the step-index-profile POFs available in the open market (Øcladding=75 µm, 125 µm, 250 µm, 380 µm, 1500 µm, 2000 µm, or 3000 µm).

The external layers 3 and 4 applied by coextrusion or tandem extrusion and surrounding the POF protect the POF (1, 2) of the invention from external effects. The inner external layer 3 has a thickness of from 200 to 300 μm, for example, whereas the outer external layer 4 has a thickness of from 300 to 600 μm, for example. The thickness of the inner external layer 3 includes all values and subvalues therebetween, especially including 220, 240, 260 and 280 μm. The thickness of the outer external layer 4 includes all values and subvalues therebetween, especially including 320, 340, 360, 380, 400, 420, 440, 460, 480, 500, 520, 540, 560 and 580 μm.

The selection of the thickness of the two outer layers in preferred embodiments is such that the external diameter of the cable is 2.2±0.1 mm (with Øcladding=1000 μm or 750 μm) or 1.5±0.1 mm (with Øcladding=500 μm).

The molding composition forming the inner external layer 3 and serving as inner protective covering, and having good adhesion to the fluorinated polymer of the fiber cladding 2, comprises a polyamide whose amino end group concentration is generally in the range from 50 to 500 μeq/g, preferably in the range from 60 to 300 μeq/g, and particularly preferably in the range from 90 to 250 μeq/g. The amino end group concentration of the polyamide includes all values and subvalues therebetween, especially including 100, 150, 200, 250, 300, 350, 400 and 450 μeq/g.

In principle there are no limitations on the carboxy end group concentration, but it is preferably not more than 30 μeq/g, particularly preferably not more than 20 μeq/g, and especially preferably not more than 15 μeq/g.

The excess of amino end groups is established in a known manner by adding a mono- or diamine at the start of or during the polycondensation, the mono- or diamine being copolymerized as chain regulator. Suitable chain regulators are any of the monoamines and diamines preferably having only primary amino groups, e.g. hexylamine, octylamine, ethylhexylamine, dodecylamine, tridecylamine, dibutylamine, stearylamine, triacetonediamine, 1,4-diaminobutane, 1,6-diaminohexane, diaminocyclohexane, trimethylhexamethylenediamine, 1,8-diaminooctane, 1,10-diaminodecane, 1,12-diaminododecane, m- or p-xylylenediamine, cyclohexyldimethylenediamine, bis(p-aminocyclohexyl)methane, other aliphatic, cycloaliphatic, or aromatic mono- or diamines which contain from 2 to 44 carbon atoms and in particular from 6 to 36 carbon atoms, and also mixtures of these amines. In the case of PA 1012 or PA 1212, it is particularly advantageous to use a stoichiometric excess of the polyamide-forming diamine component.

PA 11 is prepared industrially by polycondensation of ω-aminoundecanoic acid, and PA 12 by polymerization of laurolactam, whereas PA 1012 is prepared by polycondensation of an equimolar mixture of 1,10-decanediamine and 1,12-dodecanedioic acid, and PA 1212 by polycondensation of an equimolar mixture of 1,12-dodecanediamine and 1,12-dodecanedioic acid. It is also possible to use copolyamides based on one of these polyamides and containing not more than 30 mol % of comonomers, the comonomers having been selected from dicarboxylic acids having from 6 to 36 carbon atoms, and diamines having from 6 to 36 carbon atoms, and aminocarboxylic acids having from 6 to 12 carbon atoms, and lactams having from 6 to 12 carbon atoms.

The molding composition for the inner external layer 3 may also comprise additives, such as UV stabilizers, heat stabilizers, crystallization accelerators, pigments, and lubricants, alongside the polyamide. In one preferred embodiment, the molding composition has been colored black, preferably by adding carbon black, so that no extraneous light enters the fiber core.

In order to 1) achieve adequate adhesion at the low melt temperature required by the limited heat resistance of the PMMA core, and 2) avoid elliptical deformation of the cladding or the core due to excessive melt pressure, the zero-shear viscosity of the molding composition at 220° C., measured in a mechanical spectrometer (cone and plate) according to ASTM D4440, has to be in the range from 400 to 6000 Pas, preferably in the range from 500 to 3000 Pas, particularly preferably in the range from 600 to 2000 Pas, and with particular preference in the range from 700 to 1200 Pas. The zero-shear viscosity of the molding composition includes all values and subvalues therebetween, especially including 500, 1000, 1500, 2000, 2500, 3000, 3500, 4000, 4500, 5000 and 5500 Pas.

The polyamide for the outer external layer and the polyamide for the inner external layer may be selected from the same group. However, the polyamide for the outer external layer may also be a polyetheramide based on one of these polyamides. Polyetheramides are in principle known, e.g. from DE-A 30 06 961. Alongside the polyamide-forming monomers, the preparation of the polyetheramide uses a polyetherdiamine which is obtainable for example via conversion of the corresponding polyetherdiol through reductive amination, or coupling to acrylonitrile followed by hydrogenation (e.g. EP-A-0 434 244; EP-A-0 296 852). The polyetherdiamine generally has a number-average molecular weight of from 230 to 4000, and its content in the polyetheramide is preferably from 5 to 50% by weight. The number-average molecular weight of the polyetherdiamine includes all values and subvalues therebetween, especially including 250, 500, 750, 1000, 1250, 1500, 1750, 2000, 2250, 2500, 2750, 3000, 3250, 3500 and 3750. The content of polyether amide in polyetherdiamine includes all values and subvalues therebetween, especially including 10, 15, 20, 25, 30, 35, 40 and 45% by weight.

The flame retardant present, where appropriate, in the molding composition for the outer external layer may be any flame retardant conventionally used for polyamide molding compositions, for example polyhalobiphenyl, polyhalodiphenyl ether, polyhalophthalic acid or a derivative thereof, polyhalooligo- or -polycarbonates, or halogenated polystyrenes, the corresponding bromine compounds being particularly effective; melamine cyanurate, melamine phosphate, melamine pyrophosphate, elemental red phosphorus; organophosphorus compounds, such as phosphonates, phosphinates, phosphinites; phosphine oxides, such as triphenylphosphine oxide; phosphines, phosphites, or phosphates, such as triphenyl phosphate. Other compounds also suitable as flame retardants are those which contain phosphorus-nitrogen bonds, for example phosphonitrile chloride, phosphoric ester amides, phosphoramides, phosphonamides, phosphinamides, tris (aziridinyl)phosphine oxide, or tetrakis(hydroxymethyl) phosphonium chloride.

If a halogenated flame retardant is used, concomitant use of a synergist is possible in amounts of up to 20%, preferably from 0.1 to 15% by weight, based on the molding composition. The amount of synergist includes all values and subvalues therebetween, especially including 0.5, 1, 3, 5, 7, 9, 11, 13, 15, 17 and 19% by weight. Examples of these synergists are compounds of cadmium, of zinc, of aluminum, of silver, of iron, of copper, of antimony, of tin, of magnesium, of manganese, of vanadium, and of boron. Examples of particularly suitable compounds are oxides of the metals mentioned, and also carbonates and oxycarbonates, hydroxides, and salts of organic or inorganic acids, such as acetates or phosphates or hydrogenphosphates, and sulfates.

Other suitable flame retardants are oxide hydrates of magnesium or aluminum. It is preferable to use halogen-free flame retardants.

Impact modifiers which may be used are any of the types conventionally used in polyamides. For example, the impact modifier may be selected from the following classes of compound:

a) Ethylene-$C_3$–$C_{12}$-α-olefin copolymers having from 20 to 96% by weight ethylene content, preferably from 25 to 85% by weight ethylene content. The ethylene content includes all values and subvalues therebetween, especially including 30, 40, 50, 60, 70, 80 and 90% by weight. An example of a $C_3$–$C_{12}$-α-olefin used is propene, 1-butene, 1-pentene, 1-hexene, 1-octene, 1-decene, or 1-dodecene. Typical examples of these materials are ethylene-propylene rubber and LLDPE.

b) Ethylene-$C_3$–$C_{12}$-α-olefin-unconjugated diene terpolymers having from 20 to 85% by weight ethylene content, preferably from 25 to 75% by weight ethylene content, and not more than about 10% by weight of an unconjugated diene, such as bicyclo[2.2.1]heptadiene, 1,4-hexadiene, dicyclopentadiene, or in particular 5-ethylidenenor-bornene. The ethylene content includes all values and subvalues therebetween, especially including 30, 40, 50, 60, 70 and 80% by weight. Compounds suitable as $C_3$–$C_{12}$-α-olefin are the same as those described under a). The preparation of these terpolymers, and also of the copolymers described under a), with the aid of a Ziegler-Natta catalyst follows the known methods.

c) Ethylene-acrylate copolymers containing from 50 to 94% by weight of ethylene, from 6 to 50% by weight of an acrylic or methacrylic ester, and from 0 to 44% by weight, preferably from 0.1 to 20% by weight, of other comonomers, e.g. a $C_3$–$C_{12}$-α-olefin, as described under a), styrene, an unsaturated mono- or dicarboxylic acid, e.g. acrylic acid, methacrylic acid, maleic acid, monobutyl maleate, or itaconic acid, an unsaturated dicarboxylic anhydride, e.g. maleic anhydride or itaconic anhydride, an unsaturated oxazoline, e.g. vinyloxazoline or isopropenyloxazoline, an unsaturated epoxide e.g. glycidyl acrylate, glycidyl methacrylate, or allyloxirane, or else an unsaturated silane, e.g. vinyltri-methoxysilane, vinyltris(2-methoxyethoxy)silane, 3-methacryloxypropyltrimethoxysilane, or 3-methacryloxypropyltriethoxysilane. The amount of ethylene in the ethylene-acrylate copolymers includes all values and subvalues therebetween, especially including 55, 60, 65, 70, 75, 80, 85 and 90% by weight. The amount of acrylic or methacrylic ester includes all values and subvalues therebetween, especially including 10, 15, 20, 25, 30, 35, 40 and 45% by weight. The amount of comonomer includes all values and subvalues therebetween, especially including 5, 10, 15, 20, 25, 30, 35 and 40% by weight. The preparation of these ethylene-acrylate copolymers by free-radical polymerization is generally known.

d) Styrene-ethylene/butene-styrene block copolymers (SEBS), obtainable by hydrogenating styrene-butadiene-styrene block copolymers.

e) Polyalkenylenes, which can be prepared by ring-opening or ring-expanding polymerization of cycloalkenes (see K. J. Ivin, T. Saegusa, "Ring-opening Polymerisation", Vol. 1, Elsevier Appl. Sci. Publishers, London, in particular pp. 121–183 (1984)). Among these, preference is given to polyoctenylenes (A. Dräxler, Kautschuk+Gummi, Kunststoff 1981, pp. 185–190).

f) LDPE (high-pressure polyethylene).

g) Acrylonitrile-butadiene-styrene (ABS) copolymers having more than 50% by weight butadiene content.

The functional groups preferably present in the impact modifier may be introduced via unsaturated monomers which are either copolymerized into the main chain or are grafted, by a thermal or free-radical route, onto the main chain. Particularly suitable functional groups which permit bonding to the polyamide are carboxylic acid groups, anhydride groups, imide groups, epoxy groups, oxazoline groups, or trialkoxysilane groups. A wide variety of corresponding products is commercially available.

Mixtures of various impact modifiers may, of course, also be used.

In addition, the molding composition of the outer external layer may also comprise additives, such as UV stabilizers, heat stabilizers, crystallization accelerators, plasticizers, lubricants, inorganic fillers, or reinforcing fibers.

In one preferred embodiment, this molding composition comprises a pigment used to give the composition, for example, a green, yellow, blue, red, white, or black color. The inner external layer has to adhere firmly to the fiber cladding, and the peel force here has to be at least 50 N and preferably at least 60 N. This is achieved reproducibly if the molding composition of the inner external layer is extruded onto the POF using a temperature of from 180 to 230° C., measured at the die. In contrast, there must be low adhesion between the outer external layer and the inner external layer, so that it is easy to remove the sheathing, e.g. in the region of a plug. The peel force must not be more than 30 N, preferably not more than 25 N, and particularly preferably not more than 20 N. This can be achieved using the following measures, for example, these being independent of one another:

1. Low mutual compatibility of the two molding compositions. For example, the structure of one is based on PA 11 and that of the other is based on PA 12. The extrusion temperature for the molding composition of the outer external layer is in the range from 150 to 230° C., measured at the die. The extrusion temperature includes all values and subvalues therebetween, especially including 160, 170, 180, 190, 200, 210 and 220° C.

2. Good mutual compatibility of the two molding compositions. In this case, the molding composition of the outer external layer has to be extruded onto the inner external layer at a temperature sufficiently low that no incipient melting of the latter occurs. The advantageous extrusion temperature here, measured at the die, is in the range from 150 to 200° C., preferably in the range from 160 to 190° C. The extrusion temperature includes all values and subvalues therebetween, especially including 160, 170, 180 and 190° C.

3. The molding composition of the outer layer is provided with a release agent. The release agent used here may be any of those suitable for polyamides, for example alkyl stearates, calcium stearate, fatty amides, montanic esters, wax oxidates, or siloxane copolymers.

The following test method is used to test the adhesion of the inner external layer 3 to the fiber cladding 2 and of the outer external layer 4 to the inner external layer 3:

partially stripping the protective covering from a cable of length about 500 mm, so that the length of the remaining protective covering is about 30 mm;

passing the stripped part of the cable through a hole in a plate, the diameter of the hole being somewhat larger than the external diameter of the fiber cladding or, respectively, of the inner external layer;

clamping the stripped end of the cable into a tensile testing machine (separation rate: 10 mm/min), and measuring the tensile force needed to release the protective covering.

Having generally described this invention, a further understanding can be obtained by reference to certain specific examples which are provided herein for purposes of illustration only, and are not intended to be limiting unless otherwise specified.

EXAMPLES

All of the experiments used an optical fiber from Nichimen (type 1000 B), which comprises a PMMA core and of a cladding made from a PTFE layer and a PVDF layer.

The solution viscosity $\eta_{rel}$ of the polyamides was measured on a 0.5% strength by weight solution in m-cresol at 20° C. The DSC melting points were determined on a PerkinElmer DSC 7 machine at 20 K/mm heating rate, using the 2nd heating curve. COOH end groups were determined by an alkalimetric method in hot benzyl alcohol, and $NH_2$ end groups were determined using perchloric acid in m-cresol.

1. Extrusion of the inner external layer 3 onto the fiber 1, 2

For this, use was made of a molding composition which was based on a PA 12 with $\eta_{rel}$=1.85, 90 µeq/g of amino end groups and 10 µeq/g of acid end groups, which had been colored black using 0.3% by weight of carbon black. The zero-shear viscosity of the molding composition was 800 Pas, measured based on ASTM D4440 at 220° C. This molding composition was extruded onto the fiber using a temperature of 185° C. at a linear speed of 30 m/min.

The force needed to peel the layer 3 from the fiber was determined as 55 N/30 mm.

2. Extrusion of the outer external layer 4 onto the inner external layer 3

The molding compositions described below were extruded onto the inner external layer at a temperature of 185° C. with a linear speed of 30 m/min.

The force needed to peel the layer 4 from the layer 3 was determined as less than 30 N/30 mm in every case.

Example 1

Molding Composition made from a) 100 parts by weight of a polyetheramide prepared as in the prior art from 35.83 kg of laurolactam, 6.45 kg of dodecanedioic acid, and 57.82 kg of JEFFAMINE® D 2000 (polyetherdiamine; average molecular weight 2000) with the following properties:
Melting point (DSC): 153° C.
Relative solution viscosity $\eta_{rel}$: 1.78
PA 12 block length corresponding to an average molecular weight of 1509 (calculated from the laurolactam/dodecanedioic acid ratio);

b) 20 parts by weight of MELAPUR® 25, a melamine cyanurate;

c) 0.5 part by weight of IRGANOX® 1010, a stabilizer.

The result of testing is given in Table 1.

Example 2

Molding Composition made from a) 100 parts by weight of a copolyamide made from 80 mol % of laurolactam and 20 mol % of caprolactam; $\eta$rel =1.9;

b) 22.4 parts by weight of MELAPUR® 25 (melamine cyanurate), c) 0.5 part by weight of IRGANOX® 1098 (stabilizer), d) 0.2 part by weight of CEASIT® PC (calcium stearate).

See Table 1.

Example 3

Molding Composition made from a) 58 parts by weight of PA 12; $\eta_{rel}$=1.9;

b) 40 parts by weight of EXXELOR® VA1801 (maleic-anhydride-grafted EPM rubber);

c) 15 parts by weight of ANTIBLAZE® 1045 (phosphorus-containing flame retardant);

d) 0.04 part by weight of CEASIT® PC (calcium stearate).

See Table 1.

Example 4

Molding Composition made from a) 85 parts by weight of PA 12; $\eta_{rel}$=1.6;

b) 15 parts by weight of MELAPUR® 25 (melamine cyanurate), c) 15 parts by weight of diphenyl cresyl phosphate;

d) 0.04 part by weight of CEASIT® PC (calcium stearate).

See Table 1.

Comparative Example 1

Only a single layer of a black-colored PA 12 ($\eta_{rel}$=1.66; zero-shear viscosity 400 Pas; 40 µeq/g of amino end groups) was extruded onto the fiber at 185° C. and 30 m/min. The adhesion determined on the product was 25 N/30 mm.

Comparative Example 2

The procedure was as in Comparative Example 1, with the sole difference that the PA 12 molding composition comprised 20% by weight of MELAPUR® 25. The fiber 1, 2 was found to have narrowed, and therefore had only poor optical transmission qualities.

TABLE 1

| | Results | |
|---|---|---|
| Example | Flame test[a] [s] | Acid storage [b] [d] |
| 1 | 29 | 13 |
| 2 | 28 | 20 |

TABLE 1-continued

| | Results | |
|---|---|---|
| Example | Flame test[a] [s] | Acid storage [b] [d] |
| 3 | 20 | 25 |
| 4 | 30 | 19 |

[a] Flame test carried out in accordance with DaimlerChrysler AG test procedure for linear optical conductors, version 1.1, item 2.5.1. The time expired prior to extinguishing of the flame is given.
[b] Acid storage in accordance with the above test procedure. The time expired prior to embrittlement of the immersed cable is given.

German patent application 1 022 843 9.3 filed Jun. 26, 2002, is incorporated herein by reference.

Numerous modifications and variations on the present invention are possible in light of the above teachings. It is therefore to be understood that within the scope of the appended claims, the invention may be practiced otherwise than as specifically described herein.

What is claimed is:

1. An optical cable, comprising:
a polymer optical conductor comprising a fiber core;
a single-layer or multi-layer fiber cladding;
an inner external layer which adheres to said fiber cladding with a peel force of at least 50 N and comprises a first molding composition which comprises a first polyamide; and
an outer external layer which adheres to said inner external layer with a peel force of not more than 30 N;
wherein said first polyamide is selected from the group consisting of a) PA 11, b) PA 12, c) PA 1012, d) PA 1212, e) a copolyamide of at least two of PA 11, PA 12, PA 1012 and PA 1212, said copolyamide containing not more than 30 mol % of a comonomer, and f) mixtures thereof;
wherein said first polyamide contains at least 50 $\mu$eq/g of amino end groups;
wherein said first molding composition has a zero-shear viscosity of from 400 to 6000 Pas, measured according to ASTM D4440 at 220° C.; and
wherein said outer external layer comprises a second molding composition which comprises the following i)–iii):
i) from 20 to 95% by weight of a second polyamide selected from the group consisting of a) PA 11, b) PA 12, c) PA 1012, d) PA 1212, e) a copolyamide of at least two of PA 11, PA 12, PA 1012 and PA 1212, said copolyamide containing not more than 30 mol % of a comonomer, f) a polyetheramide of at least one of a)–e), and g) mixtures thereof,
ii) from 5 to 45% by weight of a flame retardant, and
iii) from 0 to 60% by weight of an impact modifier,
wherein an amount of i), ii) and iii) is based on a total amount of i)+ii)+iii).

2. The optical cable as claimed in claim 1, wherein said first molding composition of said inner external layer has a zero-shear viscosity of from 500 to 3000 Pas.

3. The optical cable as claimed in claim 1, wherein said first molding composition of said inner external layer has a zero-shear viscosity of from 600 to 2000 Pas.

4. The optical cable as claimed in claim 1, wherein said first molding composition of said inner external layer has a zero-shear viscosity of from 700 to 1200 Pas.

5. The optical cable as claimed in claim 1, wherein said fiber core comprises PMMA.

6. The optical cable as claimed in claim 1, wherein said fiber cladding comprises polyvinylidene fluoride.

7. The optical cable as claimed in claim 1, wherein said first molding composition of said inner external layer has been colored black.

8. The optical cable as claimed in claim 1, wherein an optical attenuation of said fiber core is from 70 to 100 db/km at $\lambda$=570 nm.

9. The optical cable as claimed in claim 1, wherein an optical attenuation of said fiber core is from 125 to 150 db/km at $\lambda$=650 nm.

10. The optical cable as claimed in claim 1, wherein said fiber cladding comprises a fluorinated polymer.

11. The optical cable as claimed in claim 1, wherein said cladding material comprises polyvinylidene fluoride, optionally mixed with one of PMMA, a polyglutarimide, or an acrylate copolymer.

12. The optical cable as claimed in claim 1, wherein said inner external layer has a thickness of from 200 to 300 $\mu$m.

13. The optical cable as claimed in claim 1, wherein said outer external layer has a thickness of from 300 to 600 $\mu$m.

14. The optical cable as claimed in claim 1, wherein said first polyamide contains not more than 30 $\mu$eq/g of carboxy end groups.

15. The optical cable as claimed in claim 1, wherein said first molding composition further comprises an additive selected from the group consisting of UV stabilizers, heat stabilizers, crystallization accelerators, pigments, and lubricants.

16. The optical cable as claimed in claim 1, further comprising up to 20% by weight of a synergist.

17. The optical cable as claimed in claim 16, wherein said synergist is a compound of cadmium, of zinc, of aluminum, of silver, of iron, of copper, of antimony, of tin, of magnesium, of manganese, of vanadium, or of boron.

18. The optical cable as claimed in claim 1, wherein said second molding composition comprises a release agent.

19. The optical cable as claimed in claim 1, wherein said release agent is selected from the group consisting of alkyl stearates, calcium stearate, fatty amides, montanic esters, wax oxidates, and siloxane copolymers.

* * * * *